United States Patent
Burlefinger et al.

(10) Patent No.: US 9,616,705 B2
(45) Date of Patent: Apr. 11, 2017

(54) VEHICLE WHEEL WITH A RIM MADE OF FIBER-REINFORCED SYNTHETIC MATERIAL

(71) Applicants: Bayerische Motoren Werke Aktiengesellschaft, Munich (DE); BBS Motorsport GmbH, Haslach I. K. (DE); Kringlan Composites AG, Otelfingen (CH)

(72) Inventors: Hubert Burlefinger, Furth (DE); Markus Tomasini, Putzbrunn (DE); Niccolo Pini, Zurich (CH); Roman Mueller, Schiltach (DE)

(73) Assignees: Bayerische Motoren Werke Aktiengesellschaft, Munich (DE); BBS Motorsport GmbH, Haslach (DE); Kringlan Composites AG, Otelfingen (CH)

( * ) Notice: Subject to any disclaimer, the term of this patent is extended or adjusted under 35 U.S.C. 154(b) by 376 days.

(21) Appl. No.: 14/209,251

(22) Filed: Mar. 13, 2014

(65) Prior Publication Data

US 2014/0191566 A1    Jul. 10, 2014

Related U.S. Application Data

(63) Continuation of application No. PCT/EP2011/071552, filed on Dec. 1, 2011.

(30) Foreign Application Priority Data

Sep. 14, 2011   (DE) .................. 10 2011 082 689

(51) Int. Cl.
    *B60B 5/02*  (2006.01)
    *B60B 21/00* (2006.01)
    *B29C 70/30* (2006.01)

(52) U.S. Cl.
    CPC ............. *B60B 5/02* (2013.01); *B29C 70/30* (2013.01); *B60B 21/00* (2013.01); *Y10T 156/1002* (2015.01)

(58) Field of Classification Search
    CPC ............ B60B 5/02; B60B 21/00; B29C 70/30
    (Continued)

(56) References Cited

U.S. PATENT DOCUMENTS 3,466,211 A * 9/1969 McHugh ................... B60C 3/02
    152/453
3,917,352 A * 11/1975 Gageby ................... B29C 70/24
    301/64.702

(Continued)

FOREIGN PATENT DOCUMENTS

CA    2 721 318 A1    11/2009
CA    2 473 777 C     7/2010

(Continued)

OTHER PUBLICATIONS

German language Search Report including partial English translation dated Apr. 20, 2012 (Ten (10) pages).

(Continued)

*Primary Examiner* — S. Joseph Morano
*Assistant Examiner* — Jean Charleston
(74) *Attorney, Agent, or Firm* — Crowell & Moring LLP

(57) ABSTRACT

A vehicle wheel having a rim, or a rim of a vehicle wheel, is provided wherein the rim consists of a fiber-reinforced plastic material in the form of several layers of a fiber-reinforced semi-finished plastic product. The layers are shaped to form a finished component in a press while heat is supplied. The rim conventionally consists of a rim well, whose two sides are adjoined by a rim shoulder, which transitions into a rim flange. The rim well is formed by several layers of a base laminate, which extends to the rim (Continued)

flange, between which layers further layers are inserted in the area of the rim shoulder as well as of the rim flange. The further layers have an essentially tangential fiber alignment.

11 Claims, 1 Drawing Sheet

(58) Field of Classification Search
USPC .................. 301/95.103, 104, 101, 102, 107
See application file for complete search history.

(56) References Cited

U.S. PATENT DOCUMENTS

| | | | |
|---|---|---|---|
| 4,011,651 A * | 3/1977 | Bradbury | B01D 53/86 264/128 |
| 4,483,729 A | 11/1984 | Fujisaki et al. | |
| 4,532,097 A | 7/1985 | Daniels et al. | |
| 4,636,344 A | 1/1987 | McDougall | |
| 4,749,235 A * | 6/1988 | McDougall | B60B 5/02 301/64.703 |
| 5,540,485 A | 7/1996 | Enders | |
| 5,985,072 A | 11/1999 | Finck et al. | |
| 6,926,370 B2 * | 8/2005 | Spoelstra | B29C 70/48 301/64.703 |
| 7,309,110 B2 | 12/2007 | Vernet et al. | |
| 7,934,778 B2 | 5/2011 | Denk et al. | |
| 8,070,235 B2 | 12/2011 | Reuteler | |
| 2004/0227393 A1 | 11/2004 | Meggiolan | |
| 2005/0042109 A1 | 2/2005 | Kovalsky et al. | |
| 2007/0194619 A1 | 8/2007 | Colegrove et al. | |
| 2008/0265657 A1 | 10/2008 | Reuteler | |

FOREIGN PATENT DOCUMENTS

| | | |
|---|---|---|
| CN | 201439290 U | 4/2010 |
| CN | 201646244 U | 11/2010 |
| DE | 30 06 227 A1 | 8/1980 |
| DE | 30 06 227 C2 | 10/1985 |
| DE | 35 41 074 A1 | 5/1986 |
| DE | 3541074 A1 | 5/1986 |
| DE | 101 45 630 A1 | 4/2003 |
| DE | 60115290 T2 | 7/2006 |
| DE | 10 2006 010 445 A1 | 9/2007 |
| DE | 10 2007 010 769 A1 | 9/2008 |
| EP | 0842757 A1 | 5/1998 |
| EP | 1 506 882 A1 | 2/2005 |
| EP | 1 985 435 A1 | 10/2008 |
| FR | 2836865 A1 | 9/2003 |
| GB | 2 045 700 A | 11/1980 |
| WO | WO 97/09181 | 3/1997 |
| WO | WO 03/064143 A1 | 8/2003 |
| WO | WO 03/064143 B1 | 9/2003 |

OTHER PUBLICATIONS

International Search Report including English translation dated Apr. 23, 2012 (Six (6) pages).
Chinese Office Action issued in corresponding Chinese Application No. 201180073464.X dated Jul. 3, 2015 with English translation (nine pages).
Hercules, Inc., Bacchus Works, "Graphite Composite Aircraft Landing Gear Wheel", Magna, Utah, USA, May 7, 1977.
Hoepke, Erich et al., "Nutzfahrzeugtechnik: Grundlagen, Systeme Komponenten", S. 213-214, Bild. Apr. 1982.
Opposition to a European Patent dated Apr. 13, 2016, (Five (5) pages).

* cited by examiner

VEHICLE WHEEL WITH A RIM MADE OF FIBER-REINFORCED SYNTHETIC MATERIAL

CROSS REFERENCE TO RELATED APPLICATIONS

This application is a continuation of PCT International Application No. PCT/EP2011/071552, filed Dec. 1, 2011, which claims priority under 35 U.S.C. §119 from German Patent Application No. 10 2011 082 689.0, filed Sep. 14, 2011, the entire disclosures of which are herein expressly incorporated by reference.

BACKGROUND AND SUMMARY OF THE INVENTION

The invention relates to a vehicle wheel having a rim or to a rim of a vehicle wheel, which rim consists of fiber-reinforced plastic material in the form of several layers of a fiber-reinforced semi-finished plastic product, which layers are shaped to form a finished component in a press while heat is supplied. The rim conventionally consists of a rim well, whose two sides are adjoined by a rim shoulder which changes into a rim flange. Concerning the technical background, reference is made, for example, to German Patent documents DE 30 06 227 C2 or DE 101 45 630 A1. It should explicitly be pointed out that the term "fiber-reinforced semi-finished plastic product" should be understood in an extremely general manner as a flexible material composite that is cohesive over a certain area, is predominantly laminar and relatively thin. It may be designed, for example, in the shape of a broad band or another laminar piece of material.

The use of fiber-reinforced, particularly carbon-fiber-reinforced, plastic material for the wheel (or at least the wheel rim) of a vehicle, particularly of a motor vehicle, makes it possible to achieve a particularly low component weight, whereby the so-called unsprung mass can be kept low, which is known to be very advantageous. However, the achieving of the required component rigidity may be problematic.

It is an object of the present invention to overcome the problem in providing a vehicle wheel having a rim or a rim of a vehicle wheel, which rim consists of a fiber-reinforced plastic material in the form of several layers of a fiber-reinforced semi-finished plastic product, which layers are shaped to form a finished component in a press while heat is supplied, the rim conventionally consisting of a rim well, whose two sides are adjoined by a rim shoulder which changes into a rim flange.

The solution of this task is characterized in that the rim well is formed by several layers of a base laminate, which extends to the rim flange, between which layers further layers are inserted in the area of the rim shoulder as well as of the rim flange. Advantageous further developments are described and claimed herein.

According to the invention, the rim constructed of several layers of a fiber-reinforced semi-finished plastic product is thicker in the area that is subjected to the highest load; i.e. it is formed by a larger number of layers of the semi-finished product placed above one another during the manufacturing of the rim than in the area of the so-called rim well, which is formed by a so-called base laminate extending to the two rim flanges, which base laminate also contains several layers of the fiber-reinforced semi-finished plastic product. The terms "rim well", "rim shoulder" and "rim flange" are used here corresponding to the conventional nomenclature and can also be interpreted by means of the attached schematic diagram.

It is generally known and customary that, during the manufacturing of fiber-reinforced plastic components, several layers of fiber-reinforced semi-finished plastic product are, in each case, placed on one another with a different fiber alignment; i.e. in a first layer, the reinforcing fibers (for example, carbon fibers) contained therein are oriented, for example, predominantly in the longitudinal direction; in a second layer disposed on the first layer, the fibers are preferably perpendicularly thereto in the transverse direction; and in a further third layer disposed on the second layer, the fibers are aligned, for example, at an angle of +/−45° with respect to the longitudinal direction and the transverse direction. In the case of the present invention, a comparable arrangement is also recommended for the so-called base laminate, in which layers may be provided which have an essentially tangential fiber alignment, and further layers with a fiber alignment enclosing an angle of +/−45° or 90° thereto may be provided, the tangential direction being the circumferential direction of the rim. When the fibers are aligned at an angle of 90° thereto, they extend essentially parallel with respect to the axis of rotation of the wheel having this rim. In this context, it is pointed out that these angle-related data are not absolutely binding but are to indicate an angle range and, particularly instead of the fiber alignment inclined by 45° in one or the other direction ("+/−") with respect to the tangential direction, a fiber alignment of, for example, +/−60° can also be selected.

In the present case, it was now found that, for increasing the component rigidity and while simultaneously ensuring a low elasticity, with regard to a brief impact load, it is particularly advantageous for the additional layers of fiber-reinforced semi-finished plastic product provided in the area of the rim shoulder and of the rim flange between the layers of the base laminate, to have an essentially tangential fiber alignment. In contrast, as far as the base laminate is concerned, those layers, which have an angular fiber alignment with respect to the tangential direction, can be shaped by curved segments preformed in a thermoforming process. When the individual layers are placed for the press on a so-called pre-forming tool that is virtually a component of the press, the curved segments can also be placed there. The layers are then preferably fixed by ultrasonic weld points on this preforming tool, this so-called weld-fixing preferably taking place in a single welding operation through several layers.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
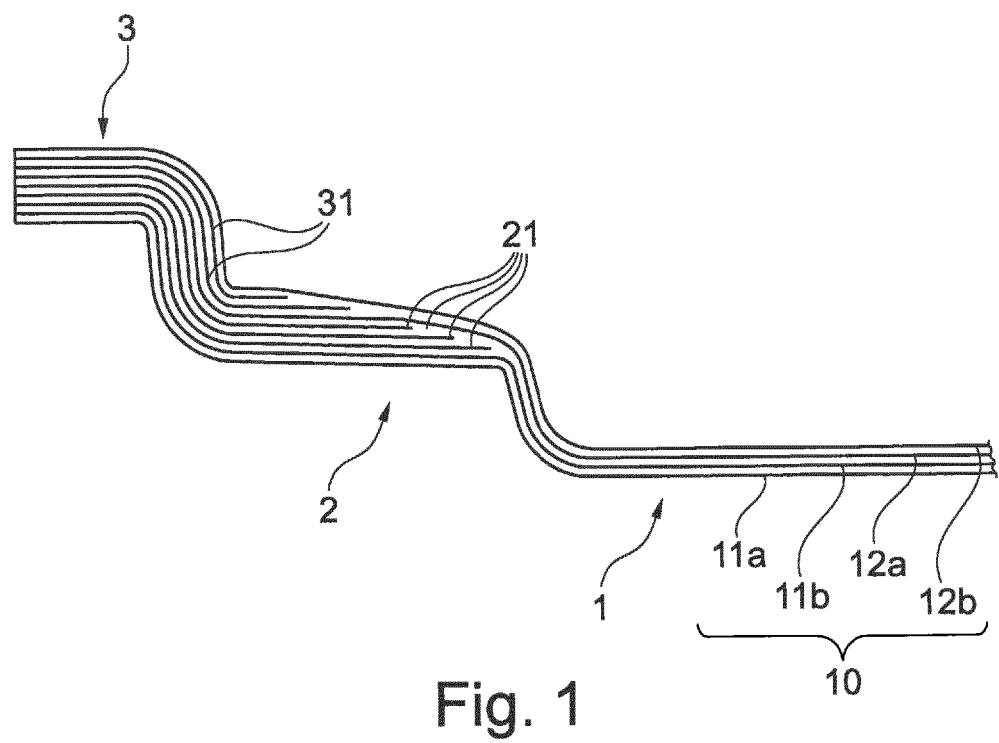
FIG. 1 is a schematic diagram of a cross-sectional view of a wheel rim according to an embodiment of the invention and of a part of the rim well with the rim shoulder and the rim flange.

With reference to FIG. 1, reference number 1 indicates the so-called rim well of a rim of a wheel of a passenger car (not shown). Viewed in the axial direction of the wheel, a so-called rim shoulder 2 adjoins the rim well 1 toward the outside. By means of its bead, the pneumatic tire (not shown), which is put on the rim, rests on the rim shoulder 2, which bead rests laterally on the rim flange 3 adjoining the rim shoulder 2.

The rim well 1 is formed by a multi-layer so-called base laminate 10. For reasons of simplicity, only four layers of fiber-reinforced semi-finished plastic products are shown here; specifically, two layers 11a, 11b, which are at the bottom in the sectional view and two layers 12a and 12b which are situated on top of the latter. (In reality, more than these four layers are provided). During the manufacturing process, first the bottom layer 11a is placed on a pre-forming tool (first compare the pre-forming tool proportionally visible in FIG. 2 and marked by the letter P), in this lowest layer 11a, the fibers being aligned essentially tangentially, i.e. in the circumferential direction of the rim. The additional lower layer 11b is placed on this lowest layer 11a, in which lower layer 11b, the fibers are, for example, aligned in the axial direction of the wheel, i.e. perpendicularly to the circumferential direction of the rim.

Before the two upper layers 12a and 12b are applied here, only in the area of the rim shoulder 2 and of the rim flange 3, several layers 21 of fiber-reinforced semi-finished plastic product, placed on one another, are applied to the preforming tool (P), more precisely to the layers already situated there, in which the fibers are aligned essentially tangentially. In the next process step of the manufacturing process, at least one of the upper layers of the base laminate 10 are applied, in this case, the layer 12a, specifically in the area of the rim flange 3, the rim shoulder 2 as well as in the area of the rim well 1. Subsequently, particularly in the area of the rim flange 3, several layers 31 of fiber-reinforced semi-finished plastic product are applied, in which the fibers are again aligned essentially tangentially, after which the quasi finally uppermost layer(s) 12b of the base laminate 10 is or are applied. As a result of the fact that, viewed from the direction of the rim flange 3, the layers 21 and 31 completely cover the rim flange 3 only proportionally in a diminishing manner virtually in steps, the rim shoulder 2, as illustrated, may have a slightly conical shape (with a diameter diminishing toward the center plane of the rim). In contrast, the rim well 1 ideally has a circular-cylindrical shape, so that the layers of the base laminate 10 can be placed there, without any twisting, simply onto the preforming tool (P).

Figure 2:
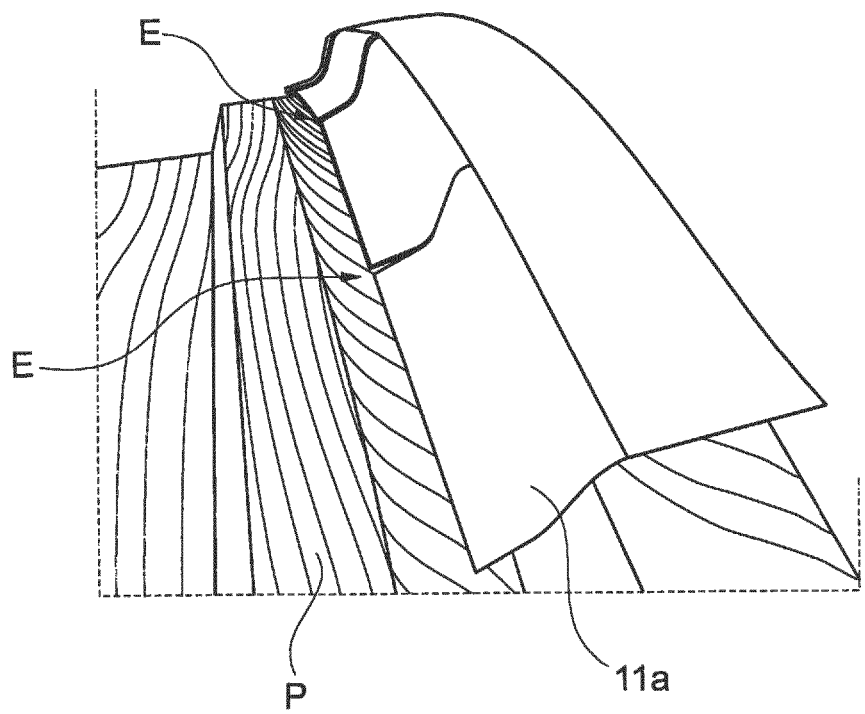
FIG. 2 is a perspective partial view of a preforming tool for such a rim with a first layer of a fiber-reinforced semi-finished plastic product with tangentially aligned fibers placed on this preforming tool.

FIG. 2 illustrates how the lowermost layer 11a with the essentially tangential fiber alignment in the transition area of the rim flange 3 to the rim shoulder 2 can be placed on a preforming tool P, by means of which then all placed layers (11a, 11b, 21, 12a, 31, 12b) can be shaped in a press, while heat is supplied, to the finished component, specifically to a rim according to the invention. Accordingly, viewed in the circumferential direction of the rim, the layer 11a may consist of a single semi-finished plastic product or a cohesive material composite in the from of a band having a certain width or of several band sections or the like arranged behind one another as semi-finished plastic products. Viewed in the axial direction of the wheel, several semi-finished plastic products may also be arranged side-by-side in the form of bands or the like or may be or will be wound onto the preforming tool P, in order to represent a layer 11a, etc. As illustrated, preferably the layer 11a may be wound in the transition area from the rim flange 3 to the rim shoulder 2 as a preconsolidated L-profile, whose bent side is cut at regular distances (cuts E), in order to compensate the curvature in the circumferential direction of the rim. A layer 11b not shown in FIG. 2, which is applied to this layer 11a and in which the fibers are predominantly aligned in the axial direction of the wheel or at an angle of 45° with respect to the above-mentioned tangential direction, requires no such cuts and is preferably composed of several curved preformed segments; i.e. it consists of several semi-finished plastic product segments which, viewed in the circumferential direction of the rim, are arranged behind one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle wheel, comprising:
    a rim having a rim well, both sides of which are adjoined by a respective rim shoulder, and each rim shoulder transitioning into a rim flange, wherein
        the rim well is formed by several layers of a fiber-reinforced synthetic semi-finished product of a base laminate extending up to the rim flange, and
        further layers are arranged between said several layers in a region of the rim shoulder and the rim flange, the further layers originating from an area of the rim shoulder and extending to an area of the rim flange.

2. The vehicle wheel according to claim 1, wherein said further layers have a substantially tangential fiber alignment.

3. The vehicle wheel according to claim 2, wherein
    the base laminate has at least two layers with a substantially tangential fiber alignment and other layers having an angular fiber alignment on the order of 45 degrees or 90 degrees with respect to the tangential fiber alignment of the at least two layers, and
    the other layers with the angular fiber alignment being shaped by curved segments preformed in a thermal forming process which, when individual layers are placed on a performing tool of the press, are also placed there.

4. The vehicle wheel according to claim 1, wherein
    the base laminate has at least two layers with a substantially tangential fiber alignment and other layers having an angular fiber alignment on the order of 45 degrees or 90 degrees with respect to the tangential fiber alignment of the at least two layers, and
    the other layers with the angular fiber alignment being shaped by curved segments preformed in a thermal forming process which, when individual layers are placed on a performing tool of the press, are also placed there.

5. The vehicle wheel according to claim 1, wherein the rim well is devoid of the further layers.

6. A rim of a vehicle wheel, the rim comprising:
    a rim having a rim well, both sides of which are adjoined by a respective rim shoulder, and each rim shoulder transitioning into a rim flange, wherein
        the rim well is formed by several layers of a fiber-reinforced synthetic semi-finished product of a base laminate extending up to the rim flange, and
        further layers are arranged between said several layers in a region of the rim shoulder and the rim flange, the further layers originating from an area of the rim shoulder and extending to an area of the rim flange.

7. The vehicle wheel according to claim 6, wherein said further layers have a substantially tangential fiber alignment.

8. The vehicle wheel according to claim 6, wherein
the base laminate has at least two layers with a substantially tangential fiber alignment and other layers having an angular fiber alignment on the order of 45 degrees or 90 degrees with respect to the tangential fiber alignment of the at least two layers, and
the other layers with the angular fiber alignment being shaped by curved segments preformed in a thermal forming process which, when individual layers are placed on a performing tool of the press, are also placed there.

9. The vehicle wheel according to claim 6, wherein the rim well is devoid of the further layers.

10. A method of manufacturing a vehicle wheel having a rim, the rim including a rim well adjoined on both sides by a respective rim shoulder that transitions into a rim flange, the method comprising the acts of:
placing a bottom layer of a fiber-reinforced synthetic semi-finished product on a pre-forming tool, wherein fibers of the bottom layer are aligned essentially in a circumferential direction of the rim;
placing an additional lower layer of a fiber-reinforced synthetic semi-finished product on the bottom layer, in which additional lower layer the fibers are aligned perpendicularly to the circumferential direction of the rim;
only in an area of the rim shoulder and the rim flange, placing several layers of fiber-reinforced semi-finished synthetic product on the layers previously arranged there, fibers of one or more of the several layers being aligned essentially in the circumferential direction of the rim;
applying an upper layer specifically in areas of the rim flange, rim shoulder and the rim well;
subsequently, in an area of the rim flange, applying several layers of fiber-reinforced semi-finished synthetic product whose fibers are aligned essentially in the circumferential direction of the rim; and
applying an uppermost layer of the base laminate in the area of the rim flange, the rim shoulder and the rim well.

11. The method according to claim 10, wherein the layers are applied such that the rim shoulder has a conical shape with a decreasing diameter toward a center plane of the rim.

* * * * *